(12) United States Patent
Curtis et al.

(10) Patent No.: US 6,518,976 B1
(45) Date of Patent: Feb. 11, 2003

(54) GRAPHICS CONTAINER

(75) Inventors: Donald B. Curtis, Bellevue, WA (US); Hock San Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/364,461

(22) Filed: Jul. 30, 1999

(51) Int. Cl.⁷ .......................... G06F 17/00; G06F 15/00
(52) U.S. Cl. ...................... 345/621; 345/620; 345/624; 707/1; 707/8; 707/502; 707/512
(58) Field of Search ........................ 345/418, 419–420, 345/427–428, 619–620, 621, 623, 624, 625, 629–630, 636, 765, 764, 766, 769, 748, 763, 805, 556, 555, 804, 835, 841, 853, 781; 707/1, 8, 101–102, 104, 502, 500, 515, 512, 516

(56) References Cited

U.S. PATENT DOCUMENTS 3,763,365 A  10/1973  Seitz ......................... 235/156
5,420,980 A   5/1995  Pinedo et al. ............... 395/164

FOREIGN PATENT DOCUMENTS

EP  0 809 210 A2  11/1997
EP  0 818 742 A1   1/1998
EP  0 858 030 A2   8/1998

Primary Examiner—Matthew Luu
Assistant Examiner—Wesner Sajous
(74) Attorney, Agent, or Firm—Woodcock Washburn LLP

(57) ABSTRACT

A method of setting a graphics container in a graphics device wherein a child application draws graphics within a parent application's graphics context. A parent application begins a graphics container, pushes the current state information to a container stack, and sets a new container transformation and a container clip region in the graphics context where the contained graphics will be displayed. The current world-to-device transformation is concatenated with the container transformation, and the current visible clip region is intersected with the container clip region for transforming the child graphics to the container. Further, an identifier is used to prevent the child from altering the container transformation set by the parent and from popping the container state stack. After the container is set by the parent application, the world and page transformations of the child application are set to default values and the clipping region is set to infinity. The child application draws graphics to the container without any knowledge that it is being contained. Further, the child is free to shrink the clipping that was set by the parent, but cannot expand it. When the container is ended by the parent, the graphics context is restored to the state prior to beginning the graphics container.

28 Claims, 5 Drawing Sheets

Parent Graphic Context

GRAPHICS CONTAINER

FIELD OF THE INVENTION

The present invention relates to image storage and processing in computers, and, more particularly, to a system wherein applications can define recursive, nested drawings of graphics rendered by other applications within containers.

BACKGROUND OF THE INVENTION

For years, applications and graphics libraries have struggled with how to support nested (i.e., embedded or contained) drawings, where one graphics file or drawing contains another graphics file or drawing which may contain yet another and so on (i.e., nested drawings). One example of this is a Windows® Metafile that contains a second Metafile. Another example is a document that contains an ActiveX control.

There are several problems associated with nested graphics and drawings. A first problem is preventing the embedded child from invalidating the state of a graphics context of the parent while the embedded child draws within another graphics context defined by the parent. This problem was solved in-part by the Windows® Graphics Device Interface (GDI) by the SaveDC and RestoreDC APIs, which can be used to save the state of the graphics context to a stack before the nested drawing starts and to restore the saved state from the stack after the nested drawing is completed. However, this solution is limited because the stack must be carefully managed, otherwise the parent's graphics context may be violated.

Another problem is that the prior art does not provide a mechanism by which a parent drawing can specify and enforce the position, size, and orientation of the nested child drawing. For example, an application can use GDI to set a graphics transformation and clipping state before a nested drawing starts, but the child drawing can reset the transformation and clipping at-will, thus invalidating the graphics state the parent set for the child drawing to use. An additional limitation is that drawings cannot be rendered the same way in both embedded and non-embedded contexts without the child application actually knowing that its graphics are being embedded. For example, if an application using GDI sets a transformation in the graphics context before starting a nested drawing, when the nested drawing queries the current transformation from the graphics context, the transformation that was set by the parent will be returned, whereas, if the same drawing was not embedded, an identity transformation would be returned. This requires different handling of the drawing operations by the child when it is embedded versus when it is not.

In view of the above, there is a need for an improved graphics engine in a computing device that overcomes the limitations of the prior art. In particular, there is a need for a graphics engine capable of embedding graphics and drawings without an application having knowledge that it is being embedded within a parent application's graphics context. Further, there is a need for a graphics engine that prevents alteration of the parent's graphics context by an embedded child application. Still further, there is a need for a graphics engine that provides a solution to the problems associated with nested graphics by making recursive, nested drawing easy for an application to accomplish. The present invention provides a solution to these problems.

SUMMARY OF THE INVENTION

The present invention addresses problems associated with nested drawings by providing BeginContainer and EndContainer APIs that are invoked by a parent application to begin and end a container within which an embedded child will render its graphics. The BeginContainer API pushes the current state information (e.g., graphics context) to a container stack and sets a new container transformation and a container clip region in the graphics context where the contained graphics will be displayed. The current world-to-device transformation is concatenated with the container transformation and the current visible clip region is intersected with the container clip region for transforming the child graphics to the container. Further, an identifier is used to prevent the child from altering the container transformation set by the parent, and from popping the container state stack.

After the container is set by the parent application, the world and page transformations of the child application are set to default values and the clipping region is set to infinity. The child application draws graphics to the container without any knowledge that it is being contained. The child is free to shrink the clipping that was set by the parent, but cannot expand it. When the EndContainer API is called by the parent application, the container stack is popped and the graphics context is restored to the state prior to calling the BeginContainer.

Other features of the invention are described below.

BRIEF DESCRIPTION OF THE DRAWINGS

The foregoing summary, as well as the following detailed description, is better understood when read in conjunction with the appended drawings. For the purpose of illustrating the invention, like references numerals represent similar parts throughout the several views of the drawings, it being understood, however, that the invention is not limited to the specific methods and instrumentalities disclosed. In the drawings.

DETAILED DESCRIPTION OF THE INVENTION

The present invention provides for graphical containers set by a parent application within which embedded graphics may be drawn by a child application. The graphical containers may be nested and do not require knowledge on the part of the embedded (child) application that they are actually drawing in a container. Initially, an exemplary computing environment will be described within which the present invention may be embodied. Component details and exemplary implementations will follow.

I. Computer Environment

Figure 1:
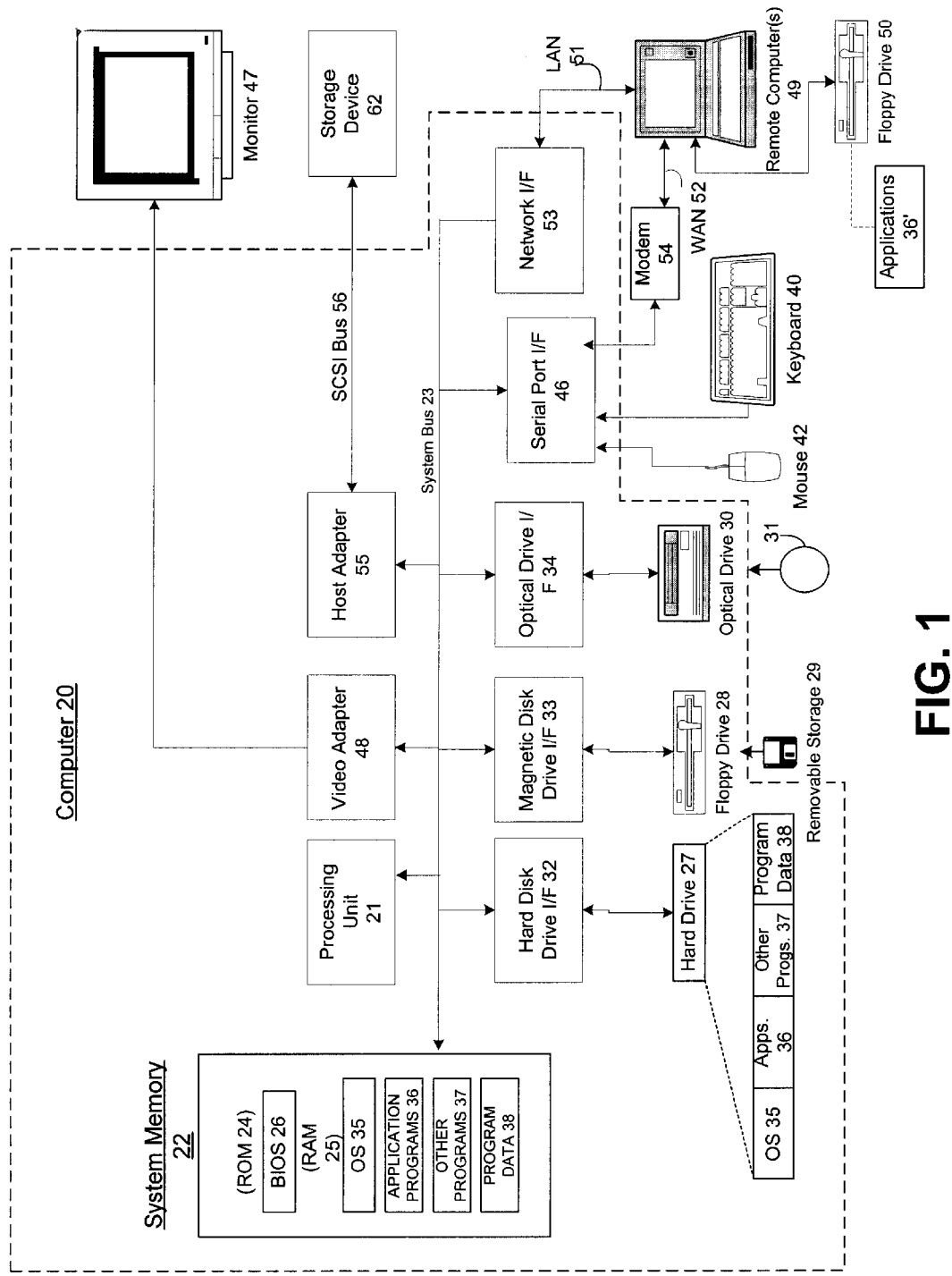
FIG. 1 is a block diagram of an exemplary environment in which the present invention may be implemented.
Figure 2:
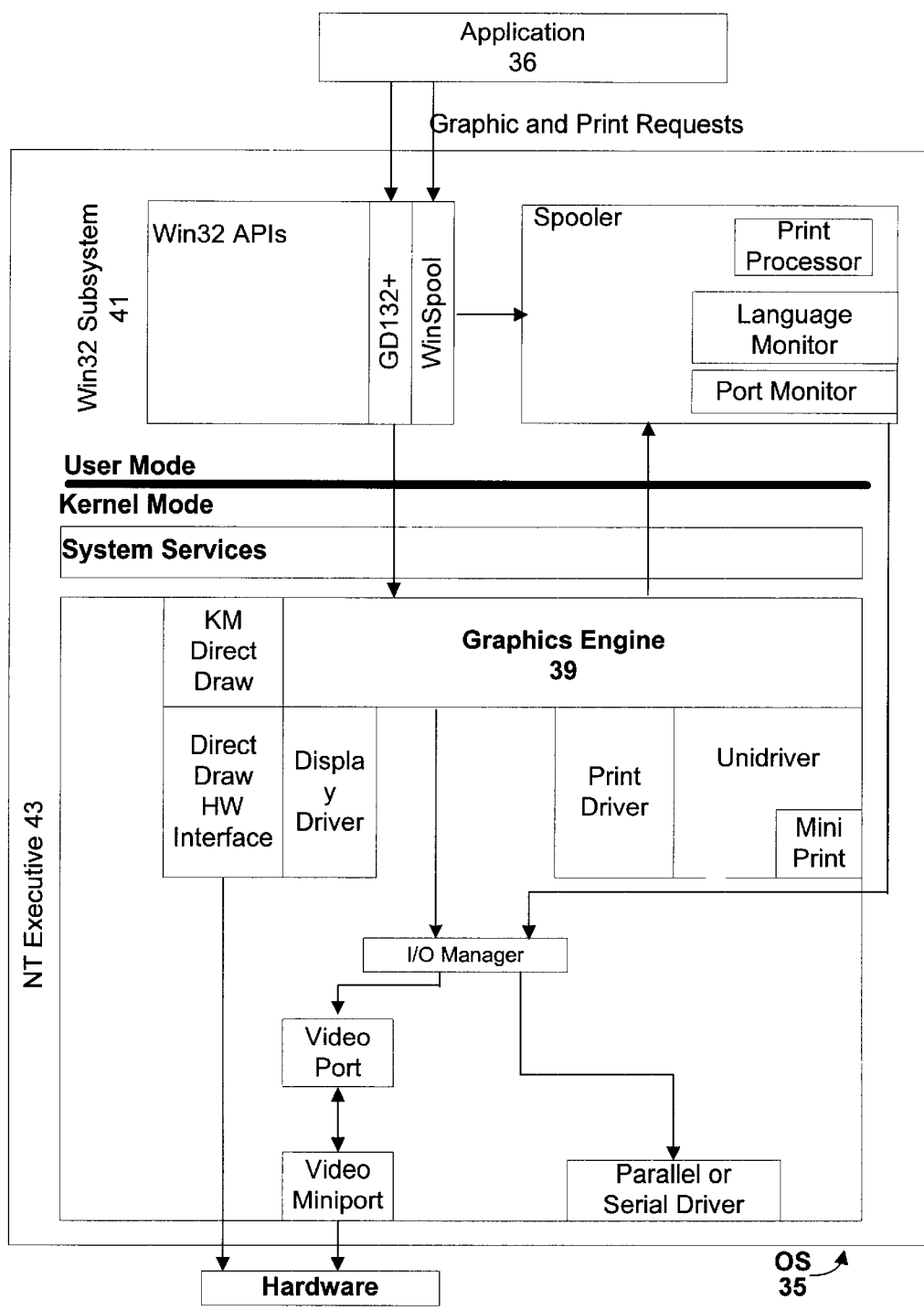
FIG. 2 is a block diagram of an exemplary operating system providing a graphics system architecture from application to driver output.

FIGS. 1 and 2, and the descriptions thereof, are provided as a brief general description of a suitable computing environment in which the invention may be implemented. Although not required, the invention will be described in the general context of computer-executable instructions, such as program modules, being executed by a computer, such as a client workstation or a server. A more detailed description of the invention will be presented with reference to FIGS. 3–6.

Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus 23, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

FIG. 2 illustrates a block diagram of an exemplary operating system 35 providing a graphics system architecture from the application 36 to driver output. In the present example, the operating system comprises the Windows NT® operating system, which provides graphics support as a part of its executive services.

Microsoft® Win32® applications request graphics and print operations by calling the system-supplied Win32 GDI+ and WinSpool functions (e.g., APIs). The Win32® APIs allow application developers to implement device-independent code. The Win32® subsystem 41 routes graphics requests to a graphics engine 39 by way of the NT executive system services 43. The graphics engine 39, also referred to herein as GDI+, processes these requests in conjunction with the hardware-specific monitor 47 or printer driver. A display driver is paired with a video miniport driver to complete video display support. Each video miniport driver provides hardware-level support for its associated display driver. The Windows NT® spooler enables print jobs to be routed to local and network printers.

II. Component Details of Graphics System (GDI+) of the Present Invention

The following describes an improved method for storing and processing contained graphics in an advanced graphics system.

A. Coordinate Spaces

Figure 3:
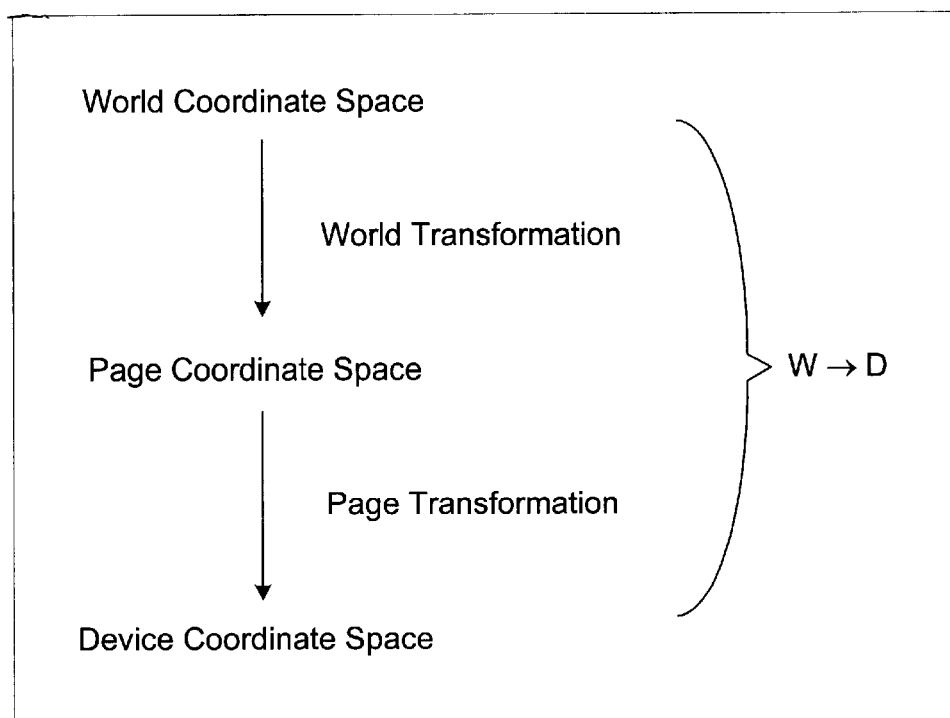
FIG. 3 illustrates graphics coordinate spaces utilized in the graphics system of FIG. 2.
Figure 4:
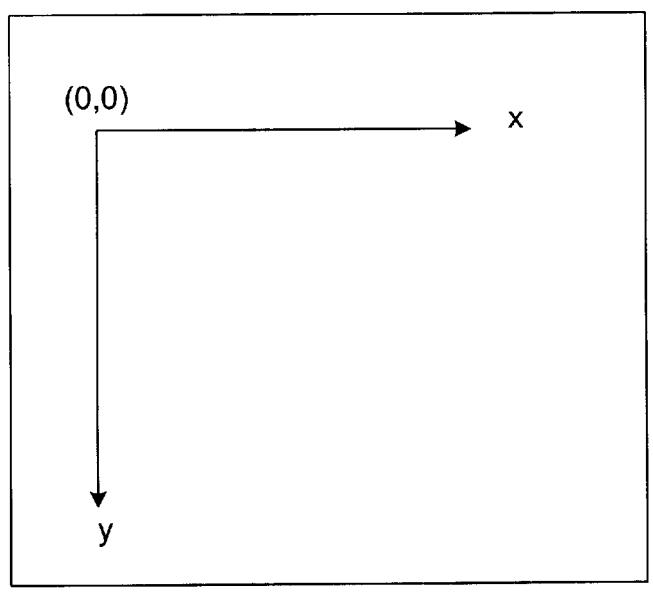
FIG. 4 illustrates an exemplary coordinate system with the graphics system of FIG. 2.

Referring to FIG. 3, the graphics model supports three graphics coordinate spaces: world, page, and device coordinate spaces. Graphics coordinates are preferably provided by the application 36 to GDI+ 39 in world coordinates. A exemplary default coordinate system is shown in FIG. 4, wherein positive x is to the right, positive y is down, and the origin is at the top-left corner of the drawing surface. In addition to the world and page transforms, the system may apply an additional transform, called a system transform (not shown), to convert device coordinates to screen coordinates on the drawing surface. The system transform is used by the system to map graphics drawing to the drawing surface, typically in a window. Applications cannot modify the system transform.

Geometrical transforms convert graphics coordinates between coordinate spaces, and are part of the graphics states. As shown in FIG. 3, the world transform converts graphic coordinates from the world space to the page space. The page transform converts graphics coordinates from the page space to the device space, which completes the world-to-device transformation (W→D). The page transform does not define any clipping in the graphics context. The application 36 can initialize, modify, and retrieve the page transform in the graphics context.

The page transform is described by a page unit, a scale, an origin, and an orientation. The page unit defines the units in page space, as shown in Table 1. All units are device independent except PIXEL, whose physical size varies from device to device. The default page unit is DISPLAY.

TABLE 1

| Page Unit | Measurement |
| --- | --- |
| MILLIMETER | Each unit represents 1 millimeter. |
| INCH | Each unit represents 1 inch. |
| PT | Each unit represents a printer's point, or 1/72 inch. |
| DISPLAY | Each unit represents 1/75 inch. This is the default. |
| DOCUMENT | Each unit represents 1/300 inch. |
| PIXEL | Each unit represents one device pixel. The size varies from device to device. |

The page scale modifies the scale of page units along x- and y-axes in the page space. The default page scale is 1. The page origin specifies the location of the origin in the page space, and is specified in the given scaled page units relative to the top-left corner of the drawing surface, as shown in FIG. 4. The page orientation defines the direction of x- and y-axes in page space and has a geometrical effect on graphics coordinates, with the exception of text. The x-axis directions are LEFT_TO_RIGHT and RIGHT_TO_LEFT. The y-axis directions are TOP_TO_BOTTOM and BOTTOM_TO_TOP. Thus, The default page orientation shown in FIG. 4 is LEFT_TO_RIGHT and TOP_TO_BOTTOM.

B. Transforms

There are two techniques to specify a geometric transform, the first is to apply a transform matrix, and the second is to use a mapping transform. A transform matrix is preferably a 2D affine matrix represented by the following matrix:

$$\begin{bmatrix} m11 & m12 & 0 \\ m21 & m22 & 0 \\ dx & dy & 1 \end{bmatrix}$$

If W and P represent the world and page transform matrices, the relationship between the world coordinates (x, y) and the device coordinates (x', y') may be determined by the following relationship:

$$[x'\,y'\,1] = [x\,y\,1] \cdot W \cdot P$$

Various transformation matrices may be defined using the above relationship. A translation matrix with an offset vector (dx, dy) is given by:

$$\begin{bmatrix} 1 & 0 & 0 \\ 0 & 1 & 0 \\ dx & dy & 1 \end{bmatrix}$$

A scale matrix with a scale vector (sx, sy) is given by:

$$\begin{bmatrix} sx & 0 & 0 \\ 0 & sy & 0 \\ 0 & 0 & 1 \end{bmatrix}$$

A rotation matrix with an angle of θ degrees clockwise about the origin is given by:

$$\begin{bmatrix} \cos\theta & \sin\theta & 0 \\ -\sin\theta & \cos\theta & 0 \\ 0 & 0 & 1 \end{bmatrix}$$

Other transform matrices maybe implemented.

The mapping transform is a 2D affine matrix that maps a rectangle to a parallelogram. It is specified by a source rectangle and a destination parallelogram. The source rectangle is defined by its width (w), height (h), and (x, y) coordinates. The coordinates (x, y), (x+w, y), (x, y+h) and (x+w, y+h) specify the top-left, top-right, bottom-left, and bottom-right corners respectively. The destination parallelogram is given by an array of three points identifying three of its corners. The mapping transform maps the top-left corner of the rectangle to the first point, the top-right corner to the second point, and the bottom-left corner to the third point in the array. The bottom-right corner of the rectangle is mapped to the implicit fourth corner of the parallelogram. It is noted that it is preferred to perform the transforms using floating point operations for higher accuracy.

C. Transform Stack

A transform stack is maintained to save and restore the current transforms in a graphics context. For example, a Graphics.saveTransform( ) method saves a copy of the current world and page transforms onto the transform stack. The method returns a gstackTransform object, which identifies the saved transforms in the stack that can be used later to identify and restore the world and page transforms using a Graphics.restoreTransform method. The gstackTransform object also provides a mechanism by which a child application can be prevented from invalidating the graphics context of the parent. The current world and page transforms are preferably not modified in the method. The Graphics.restoreTransform(gstackTransform) method restores the current world and page transforms with previously saved transforms from the transform stack. The saved transforms and all transforms above it, if they exist, are removed from the stack by this method.

D. Regions

A region describes the interior or area of geometric shapes (e.g., rectangle, ellipses, pies, and polygons) and paths and may be used in clipping, drawing, and hit testing operations. A region object describes a region, supports the persistence interface and may be cloned. The region object may create a rectangular region having a rectangular interior, or a path having an interior defined by the path. An application 36 can initialize a region, modify the region's interior, transform the region's coordinates, obtain the bounding rectangle, determine if the region's interior is empty or infinite, and determine if two regions are equal.

A region is described by a combination of rectangles, ellipses, polygons, pies and paths, and its coordinates are given in world coordinates and, therefore, are scalable. An application can retrieve a region using a Region.getRegionData method. The region data (i.e., path, rectangle, operations and transforms) is saved and can later be used to reconstruct the region. The Region.getRegionData (regionData) method retrieves the data describing a region.

A region may be used to clamp the output of drawing operations to an area described by its interior on a surface. Such regions are called "clipping regions." Applications use the clipping region to define a drawing area; the window manager uses a clipping region to limit graphics output to the window; and the printer driver uses a clipping region to limit graphics output on the paper one band at a time. The clip region defines the clipping for application drawing operations and is a graphics state. An application 36 can initialize the clip region, modify the clip region's interior, offset the clip region's coordinates, and retrieve a copy of the clip region in the graphics context.

Clipping regions are scalable and their coordinates are preferably given and maintained in world units. Further, both scalable and scan-converted clipping regions can be returned by the graphics engine 39. A complement region combine operation and region coordinate transform are supported.

A clipping region stack, which is used to save and restore the current clip region, is maintained in the graphics context. The current clip region can be saved using a Graphics.saveClip( ) method, which saves a copy of the current clip region onto the clip region stack. It returns a gstackclip object that can be used later to identify and restore the clip region in a Graphics.restoreClip method. The current clip region is not modified. The Graphics.restoreClip (gstackClip) method restores the current clip region with a copy of a previously saved clip region from the clip region stack. The gstackClip object identifies the saved clip region in the stack. The saved clip region and all clip regions above it, if they exist, are removed from the stack.

In addition to the clip region, the system may define its own clipping region called the system-clip region in order to limit graphics output by an application to the drawing surface. For example, the window manager uses the system-clip region to clamp graphics output to the window; and the printer driver uses it to limit graphics output on the paper one band at a time. Applications cannot modify the system-clip region. The system-clip region may be highly volatile because in a windowing environment, the system-clip region is the visible area of the window and changes with the area. The visible-clip region is the clipping region that defines the current clipping state of a graphics context, and is the intersection of all current clipping regions, including the clip region and the system-clip region in the graphics context. Drawing operations are always clipped to the visible-clip region. An application can obtain the bounding rectangle of the visible-clip region, determine if it is empty or infinite, and retrieve a copy of the region.

When a region is used in clipping, drawing, and hit testing operations, its coordinates are transformed and the interior approximated by a series of rectangles representing its area on a drawing surface in pixel units. This process is known as scan conversion. An application can retrieve the rectangles approximating a region in a scan conversion using a Region.getRegionScans method. The Region.getRegionScans(rects, matrix, graphics) method retrieves the rectangles approximating a region on the drawing surface of a graphics context in a scan conversion. It retrieves the rectangles in pixel units and also returns the matrix that converts pixel units to world units. The current transform in the graphics context is used in the scan conversion. The rects parameter specifies an array of rectangles to receive the data. The matrix parameter specifies the matrix to receive the transform from pixel to world units. It returns the number of rectangles to be retrieved if rects is NULL. Otherwise, it returns the number of rectangles retrieved.

E. Container Graphics

Figure 5:
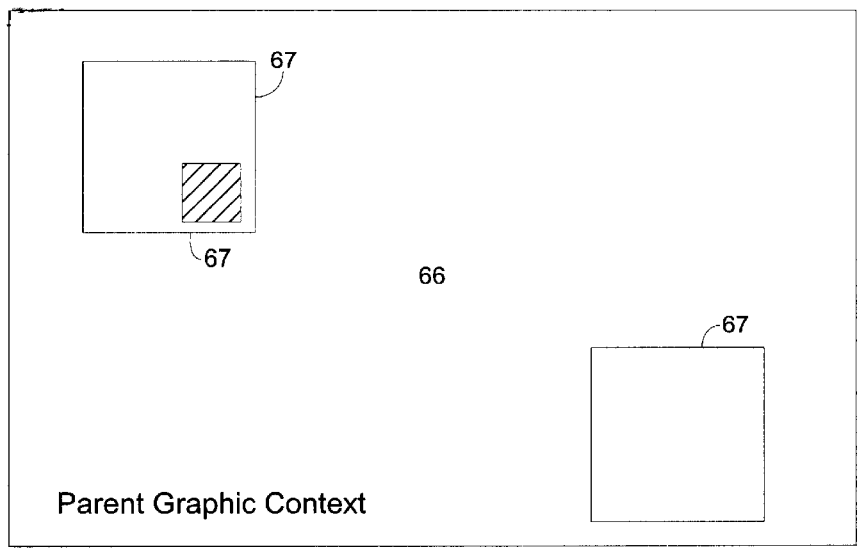
FIG. 5 illustrates a graphics context having plural graphics containers therein.

In accordance with the present invention, an application may perform embedded drawing operations using the GDI+ container graphics operations. As illustrated in FIG. 5, a parent application may draw graphics to a graphics context 66 (i.e., the parent application's "world space") and set an arbitrary container 67 within which a child application is to draw graphics. To enable such a feature without the child being aware that it is being embedded within the parent's graphic context, the graphics engine 39 supports a global transform having a "container transform" and a clipping called a "container clipping" that apply to embedded graphics and drawings. Container graphics operations may also be used in metafile playback and nested drawing operations.

Figure 6:
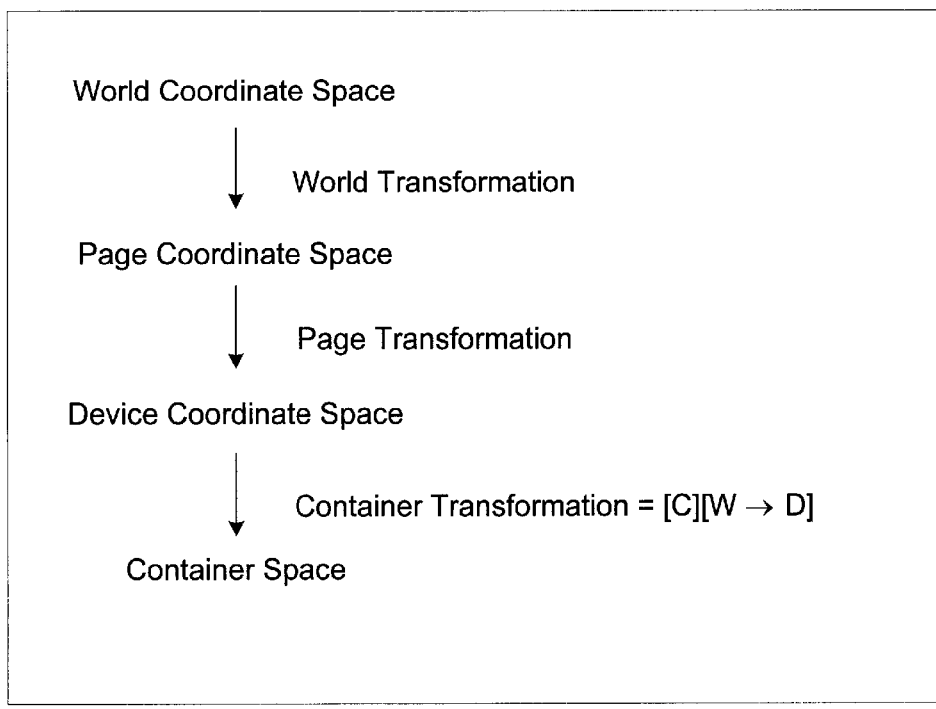
FIG. 6 illustrates the graphics coordinate spaces of FIG. 3, further including the container transformation of the present invention.

Referring now to FIG. 6, the container transform defines a global transform for embedded drawing operations. It maps the device coordinates of subsequent drawing primitives to the world coordinates of the graphics context. The contained graphics, like any other graphics primitive, is then transformed by the current world and page transforms when the container drawing begins. The container transformation is concatenated with the world-to-device transformation of the parent context to set the global transformation of the embedded graphics.

As can be understood from FIG. 6, the global transformation maps the container rectangle to the destination rectangle. This transformation is concatenated with the current world-to-device transformation (which includes any previous container transformation) and is then saved as the current container transformation. The container transformation is initialized to an identity matrix, and other transformation matrices in the graphics context are then initialized to their default states. The container transformation cannot be set (except when starting another container) or queried by the contained application, which has the effect of enforcing the positioning, size, and orientation of the contained drawing. Also, because the above is applied with the other transformations set to their defaults, child applications perform rendering of nested drawings without any knowledge that their drawings are being embedded in another drawing.

The container clipping defines a global clipping region for embedded drawing operations and clamps the output of the subsequent drawing to an area on the drawing surface. The current clipping state of the graphic context includes the container clipping, and the contained graphics is also clipped by the current clipping regions in the graphics context when the container drawing begins. Further, when a graphics object is created, the container clip region is initialized to infinity. Thus, the visible clipping is defined by intersection of the window clipping, application clipping and container clipping.

In accordance with the present invention, the above is accomplished via BeginContainer and EndContainer APIs and associated methods are used by an application to start and end a nested drawing. The methods for container graphics operations include: Graphics.beginContainer (rcSource, plgDest, rcClip), Graphics.beginContainer (rcSource, plgDest, path), and Graphics.beginContainer (rcSource, plgDest, region). The methods specify the container transform and clipping, and begin embedded graphics drawing operations. The rcSource parameter specifies the rectangle within which the embedded graphics are to be rendered in device units. The plgDest parameter points to an array of three coordinates of the destination parallelogram in world coordinates. The destination rectangle is specified in the world units of the parent application and instructs GDI+ 39 where the parent wants the child to be displayed in the "world space" of the parent application. The mapping transform specified by rcSource and plgDest defines the container transform. The rcClip, path, and region parameters specify the container clipping in world coordinates, and can specify e.g., a rectangle, path, or region. The methods return a gstackContainer object that is known and usable only by the parent application to later complete the container graphics drawing in the Graphics.endContainer method.

Figure 7:
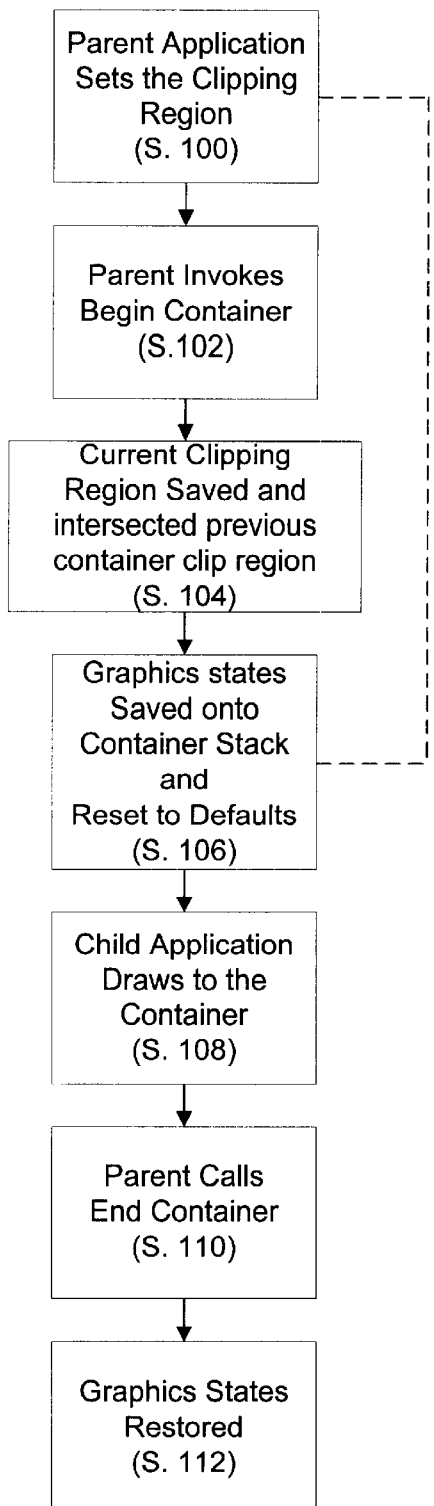
FIG. 7 illustrates a flowchart of the processes performed by the present invention.

Referring now to FIG. 7, there is illustrated a flowchart of the processes performed by the present invention. Prior to calling the BeginContainer method, the parent application sets the clipping to whatever region it wishes the contained object to be restricted to (S.100). Then, when BeginContainer is invoked by the parent application (S.102), the current clipping region is saved as the new container clip region and is intersected with any previous container clip region so that the visible clip region contains the intersection of the current application clip region and the current container clip region (S.104). The graphics engine 39 also saves the following graphics states onto a container stack and resets their current states to a default: the world and page transforms, the transform stack, the clip region, and the clip region stack (S.106). The child application then draws to the container (S.108). Nested children may draw by repeating S.100–S.106, above.

The Graphics.endContainer(gstackContainer) method ends the embedded graphics drawing operations when called by the parent application (S.100), and restores the world and page transforms, the transform stack, the clip region, and the clip region stack to their original states when the container drawing began (S.112). The gstackcontainer object identifies the container graphics operation and, as noted above, may only be used by the parent application. The method terminates any nested container graphics operations if they exist. Thus, an application can contain nested drawings without its own graphics context being changed and can specify and enforce where the contained drawing is rendered, including the area that the contained drawing is clipped against, while preserving the child's ability to render itself the same way, whether embedded or not.

In accordance with a feature of the present invention, and a noted above, the container clip region cannot be set (except when starting another container) or queried by the child application, which, advantageously, has the effect of enforcing the clipping to the area that was specified by the parent application. The nested child can shrink, but cannot expand the clipping that was set by the parent. Because the application clip region is set to its default state, the nested drawing can perform its rendering without any knowledge that it is being embedded in another drawing. These container-related objects are only set to other values when a container is started.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of nesting graphics rendered by a child application within a parent application having a graphics context comprising an application world-to-device transformation and an application clipping, said method comprising:

defining a container in said graphics context wherein the nested drawing is to be rendered;

setting a container transformation to alter said application world-to-device transformation into a global transformation for said child application; and setting a container clipping region to alter the visible clipping of said child application.

2. The method of claim 1, wherein said container transform defines said global transformation for drawing operations performed by said child application, and wherein said setting a container transformation comprises concatenating said container transform with said application world-to-device transformation of said parent application to determine said the global transformation.

3. The method as recited in claim 2, further comprising:

initializing said container transformation and said container clipping region to an identity matrix and to infinity, respectively; and initializing transformation matrices in said graphics context to default states.

4. The method as recited in claim 1, wherein said container clipping clamps the output of subsequent drawing by said child application to a predetermined area of a drawing surface to which said parent application draws.

5. The method as recited in claim 4, further comprising defining said visible clipping as the intersection of a window clipping, said application clipping and said container clipping.

6. The method as recited in claim 1, further comprising:

saving graphics states onto a container stack; and resetting said graphic states to default values.

7. The method as recited in claim 6, wherein said graphics states comprises a world transform, a page transform, a transform stack, a clipping region, and a clipping region stack.

8. The method as recited in claim 6, further comprising:

rendering the container drawing; and restoring said graphics states to their respective original states from said container stack when the container drawing rendering ends.

9. The method as recited in claim 1, wherein said container is defined in world units of said parent application.

10. The method as recited in claim 1, wherein only said parent application sets and queries said container transformation and said container clipping region.

11. The method as recited in claim 10, wherein said child application can shrink said visible clipping, but cannot expand said visible clipping beyond said container clipping set by said parent application.

12. A computer readable medium having stored thereon data and instructions for nesting graphics rendered by a child application in a container defined by a parent application rendered on a graphics device, wherein said parent application has a predetermined world-to-device transformation and a predetermined visible clipping, said instructions comprising:

setting a container transform to alter said predetermined world-to-device transformation to a container transformation of the child application; and setting a container clipping region to alter a visible clipping of the child application.

13. The computer readable medium of claim 12, wherein said container transformation comprises said container transform concatenated with said predetermined world-to device transformation of said parent application.

14. The computer readable medium as recited in claim 13, further comprising instructions to initialize said container transformation and said container clipping region to an identity matrix and to infinity, respectively.

15. The computer readable medium as recited in claim 12, further comprising instructions to save graphics states onto a container stack and to reset said graphic states to default values.

16. The computer readable medium as recited in claim 15, wherein said graphics states comprises a world transform, a page transform, a transform stack, a clipping region, and a clipping region stack.

17. The computer readable medium as recited in claim 15, further comprising instructions to restore said graphics states to their respective original states from said container stack when the rendering of drawings into said container ends.

18. The computer readable medium as recited in claim 12, wherein said container is defined in world units of said parent application.

19. The computer readable medium as recited in claim 12, wherein only said parent application sets and queries said container transformation and said container clipping region.

20. The computer readable medium as recited in claim 19, wherein said child application can shrink said visible clipping, but cannot expand said visible clipping beyond said container clipping set by said parent application.

21. In a computer implemented device having a graphics engine, a computer-readable storage medium, and at least one output device receiving graphical information from said graphics engine, a system for nesting graphics rendered by a child application within a parent application having a graphics context comprising an application world-to-device transformation and an application clipping, said computer implemented device having stored on said storage medium:

a begin container module that sets a container transform and container clipping region of a container within which said nested graphics rendered by said child application will be contained; and an end container module that returns to said graphics context of said parent application after said nesting is completed.

22. The computer implemented device of claim 21, wherein said begin container module forms said container transformation by concatenating said container transform with said application world-to device transformation.

23. The computer implemented device as recited in claim 22, said begin container module further comprising instructions to initialize said container transformation and said container clipping region to an identity matrix and to infinity, respectively.

24. The computer implemented device as recited in claim 21, said begin container module further comprising instructions to save graphics states onto a container stack and to reset said graphic states to default values.

25. The computer implemented device as recited in claim 24, wherein said graphics states comprises a world transform, a page transform, a transform stack, a clipping region, and a clipping region stack.

26. The computer implemented device as recited in claim 21, wherein said end container module further comprising instructions to restore said graphics states to their respective original states when the rendering of drawings into said container ends.

27. The computer implemented device as recited in claim 21, wherein said container is defined in world units of said parent application.

28. The computer implemented device as recited in claim 21, wherein only said parent application executes said begin container module and said end container module.

* * * * *

UNITED STATES PATENT AND TRADEMARK OFFICE
CERTIFICATE OF CORRECTION

PATENT NO.    : 6,518,976 B1
DATED         : February 11, 2003
INVENTOR(S)   : Donald B. Curtis It is certified that error appears in the above-identified patent and that said Letters Patent is hereby corrected as shown below:

Column 5,
Lines 4 and 42, please delete "comer" and insert therefore -- corner --;

Column 6,
Lines 31 and 33, please delete "comers" and insert therefore -- corners --;
Lines 33, 34, 35, 36 and 37, please delete "comer" and insert therefore -- corner --.

Signed and Sealed this

Fourth Day of November, 2003

JAMES E. ROGAN
*Director of the United States Patent and Trademark Office*